UNITED STATES PATENT OFFICE.

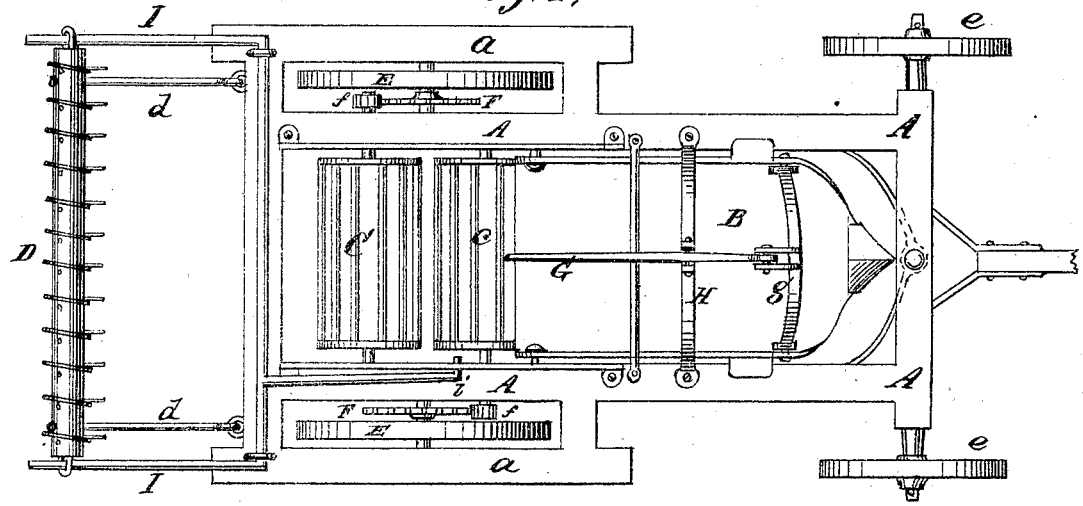

JOHN B. BAKER, OF SYRACUSE, NEW YORK.

IMPROVEMENT IN POTATO-DIGGERS.

Specification forming part of Letters Patent No. 118,895, dated September 12, 1871.

*To all whom it may concern:*

Be it known that I, JOHN B. BAKER, of Syracuse, in the county of Onondaga and State of New York, have invented a new and useful Improvement in Potato-Diggers; and I do hereby declare that the following is a full, clear, and exact description thereof, which will enable others to make and use the same, reference being had to the accompanying drawing forming part of this specification, in which—

Figure 1 is a top or plan view with the seat removed, and Fig. 2 is a sectional side view.

Similar letters of reference indicate like parts in the separate figures.

In the accompanying drawing, A is the frame-work. B is the shovel; C c, the riddle or separating cylinders. D is the rake, and E e are the supporting-wheels. The frame-work A is made with side pieces a a, and the main wheels E are placed between these parts, as shown in Fig. 1, so that a long axle is dispensed with, thus allowing the machine to be mounted on low wheels for cheapness, and at the same time allow the riddles C c to work low down between said wheels.

The riddle consists in two cylinders, C c, made up of slats or rods, each cylinder being driven independent of the other, each of the main wheels E driving one of the cylinders by means of a spur-gear and pinion, F f. The shovel B is hinged or pivoted at its rear end to the frame-work, and is suspended at its front end by a lever and bail, G g, the lever resting in an arched fulcrum, H, and the depth of the digging is controlled or regulated by said lever. The dirt and potatoes pass from the shovel onto the double riddle, where the dirt is shaken through the slats of the cylinders and the potatoes and vines carried over them. A rake, D, follows in the rear of the machine raking the vines and weeds into windrows. This rake has a series of elastic teeth that are made by coiling the wire of each tooth once or more times around the rake-head, and it is attached to the frame-work by arms d d that project rigidly from the rake-head to hold it from turning, and hook into eyes in the frame-work A. A second pair of arms, I I, that connects with each other by a cross-shaft and have bearings on the rear end of the frame, makes connection with the ends of the rake-head for raising and lowering the rakes, the operator raising and lowering the rake by a lever, i, that projects from the cross-shaft of the arms I I.

This machine is also used for eradicating quack grass, the plow B rooting it up and throwing it onto the riddle, where the dirt is separated from the roots, and, by means of the rake D, the operator gathers up the grass and roots and leaves them in windrows.

Having thus described my invention, what I claim, and desire to secure by Letters Patent, is—

The frame-work made as described, and the main wheels E, with short axles, working between the parts A a, in connection with the lantern-wheel riddles C c, driven separately, as shown, and the shovel B, as and for the purpose specified.

The above specification of my invention signed by me this 26th day of July, 1871.

J. B. BAKER.

Witnesses:
A. ALLGIER,
F. A. MORLEY.

(2.)